United States Patent [19]
Kaiser et al.

[11] 3,727,027
[45] Apr. 10, 1973

[54] METHOD OF BALANCING VERY SMALL ROTATING OBJECTS USING AIR JET ACCELERATION

[75] Inventors: Willard D. Kaiser, Grove City; Charles W. Rodman, Columbus, both of Ohio

[73] Assignee: The United States of America as represented by the United States Atomic Energy Commission

[22] Filed: Mar. 25, 1971

[21] Appl. No.: 127,902

[52] U.S. Cl.............................219/121 LM, 73/461
[51] Int. Cl. ...............................................B23k 9/00
[58] Field of Search ................219/121 L, 121 EB; 264/22, 23; 415/202; 74/5.43; 73/461–463

[56] References Cited

UNITED STATES PATENTS 3,076,342  2/1963  Hilgers..................................73/462
3,621,180  11/1971  Rolff..................................219/121 L
3,663,795  5/1972  Myer..................................219/121 L
3,499,136  3/1970  Nunnikhoven et al. .......214/121 LM

*Primary Examiner*—J. V. Truhe
*Assistant Examiner*—George A. Montanye
*Attorney*—Roland A. Anderson

[57] ABSTRACT

A system of balancing extremely small rotating devices is described. The device to be balanced is mounted on its own axes and rotated at a high rotational speed driven by an air blast. By this means only the device being balanced is rotated and the mass of fixtures need not be considered. The amount of imbalance is measured and a laser beam is used to remove a portion of the rotating device to reduce the imbalance.

1 Claim, 5 Drawing Figures

Inventors
Willard D. Kaiser
Charles W. Rodman
Attorney

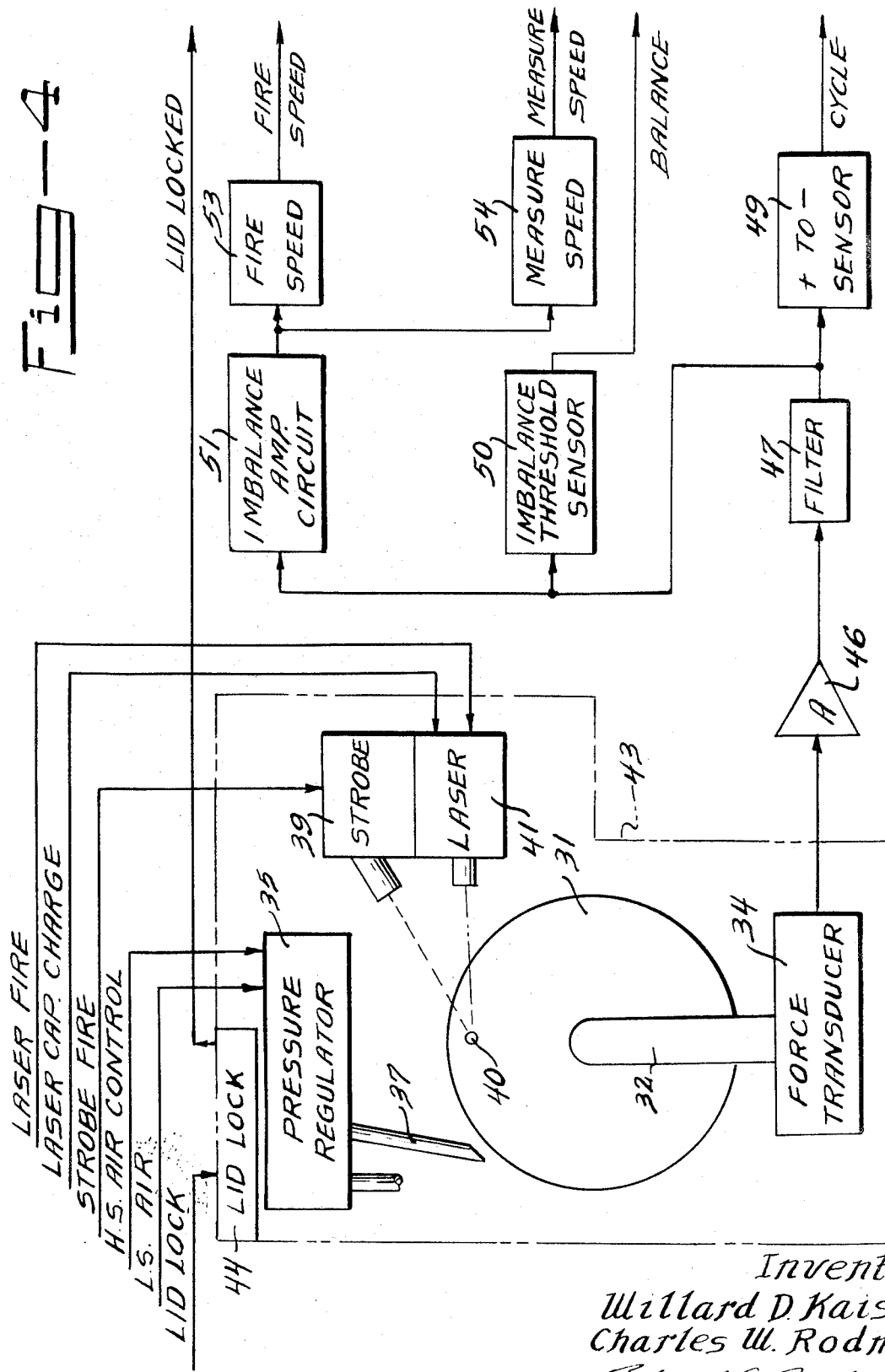

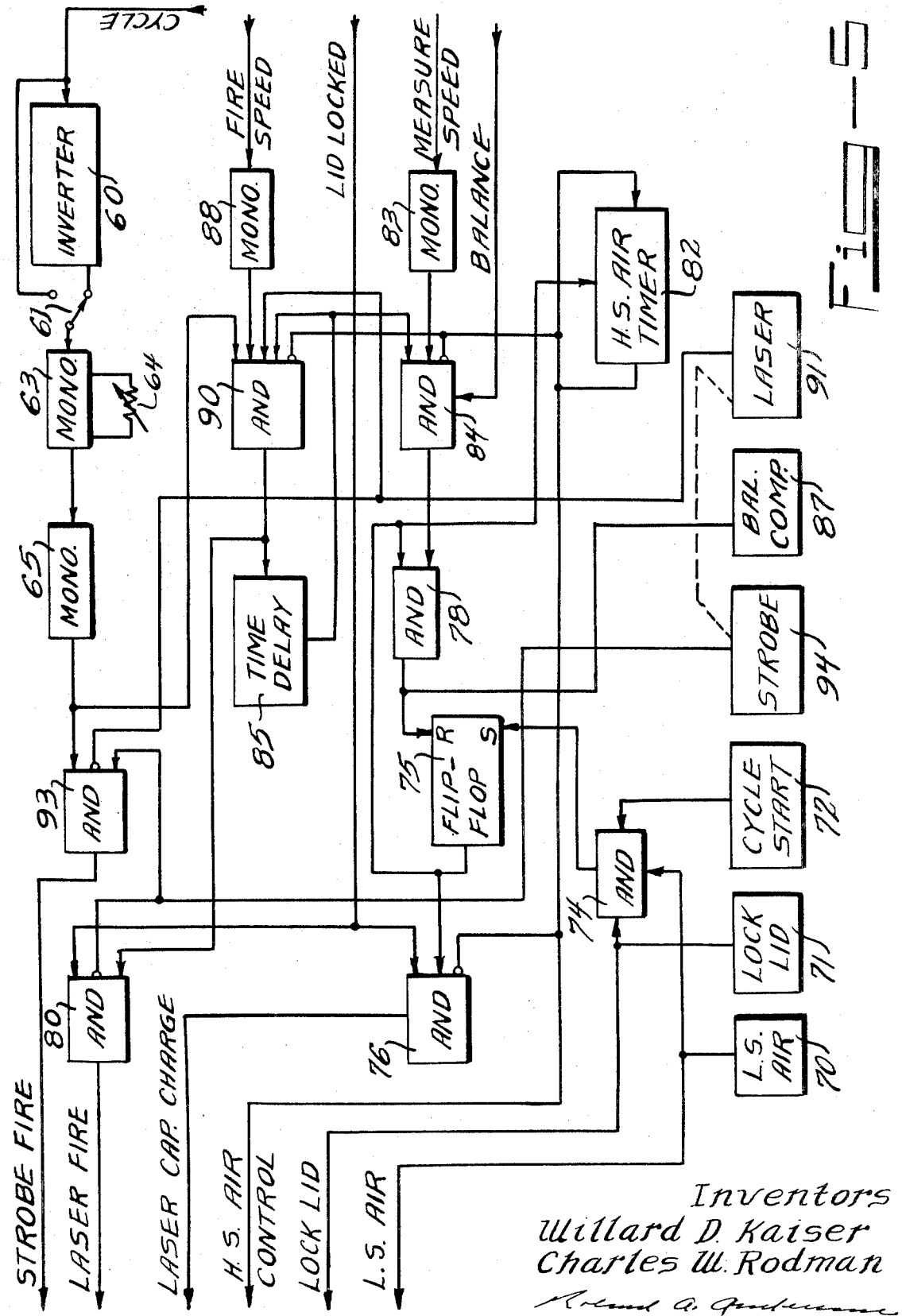

METHOD OF BALANCING VERY SMALL ROTATING OBJECTS USING AIR JET ACCELERATION

CONTRACTUAL ORIGIN OF THE INVENTION

The invention described herein was made in the course of, or under, a contract with the U.S. ATOMIC ENERGY COMMISSION.

BACKGROUND OF THE INVENTION

It is often necessary to balance rotating parts of a system in order to achieve desired stability and accuracy. Conventional methods of balancing have included the mounting of the device to be balanced in special chucks and rotating the device rapidly to determine the amount of imbalance and the location of the imbalance. Where very small parts are involved the use of chucks or other fixtures to hold the rotating part contributes an appreciable mass which may itself be imbalanced. Further, the eccentricity of the axis of the rotating chuck contributes to errors. Balancing devices of this type have achieved a resolution of the order 1 gram which is accurate for many purposes. However, where the device which is to be balanced has a mass of the order of 1 gram it is necessary to use other methods for balancing.

Hand balancing has been successfully used for balancing extremely small parts. The device is mounted on a poise and rotated to find the heaviest portion. Material is moved from the heaviest portion to improve the balance. This is continued until the required degree of balance is achieved. This hand balancing is slow, tedious and limited in its accuracy.

It is therefore an object of this invention to provide an improved system for balancing extremely small rotating masses.

Another object of this invention is to provide a system for balancing very small rotating masses in which the balancing procedure can be accomplished automatically or semiautomatically.

Another object of this invention is to provide a system for balancing very small rotating devices in which only the device being balanced is rotated.

SUMMARY OF THE INVENTION

In practicing this invention, the object which is to be balanced is mounted in bearings and spun by a jet of air. The object to be balanced is brought to a speed greater than the measuring speed and the jet of air is shut off. The rotating object is permitted to coast to the measuring speed and the amount of imbalance is measured by a transducer to which the bearings supporting the rotating object are coupled. The object then coasts to a lower balancing speed at which a small portion of the object is removed.

A laser is mounted and aimed at the rotating object. The laser firing circuit is synchronized with the imbalance force measured by the transducer so that a small portion of the object can be removed by firing the laser. The laser is triggered at the appropriate point in the object's revolution in order to decrease the amount of imbalance force present. After firing, the rotating object is permitted to achieve equilibrium and is then accelerated to speed by the jet of air to repeat the cycle. A strobe unit can be used in conjunction with the laser in order to permit changing of the point at which a portion of the object is removed to achieve balance.

BRIEF DESCRIPTION OF THE DRAWINGS

The invention is illustrated in the drawings, of which:

FIG. 4 is a block diagram showing the structure by which the imbalance forces are measured and the laser or strobe is fired; and FIG. 5 is a block diagram of the logic system for controlling the measurement and firing of the laser.

DETAILED DESCRIPTION OF THE INVENTION

Figure 1:
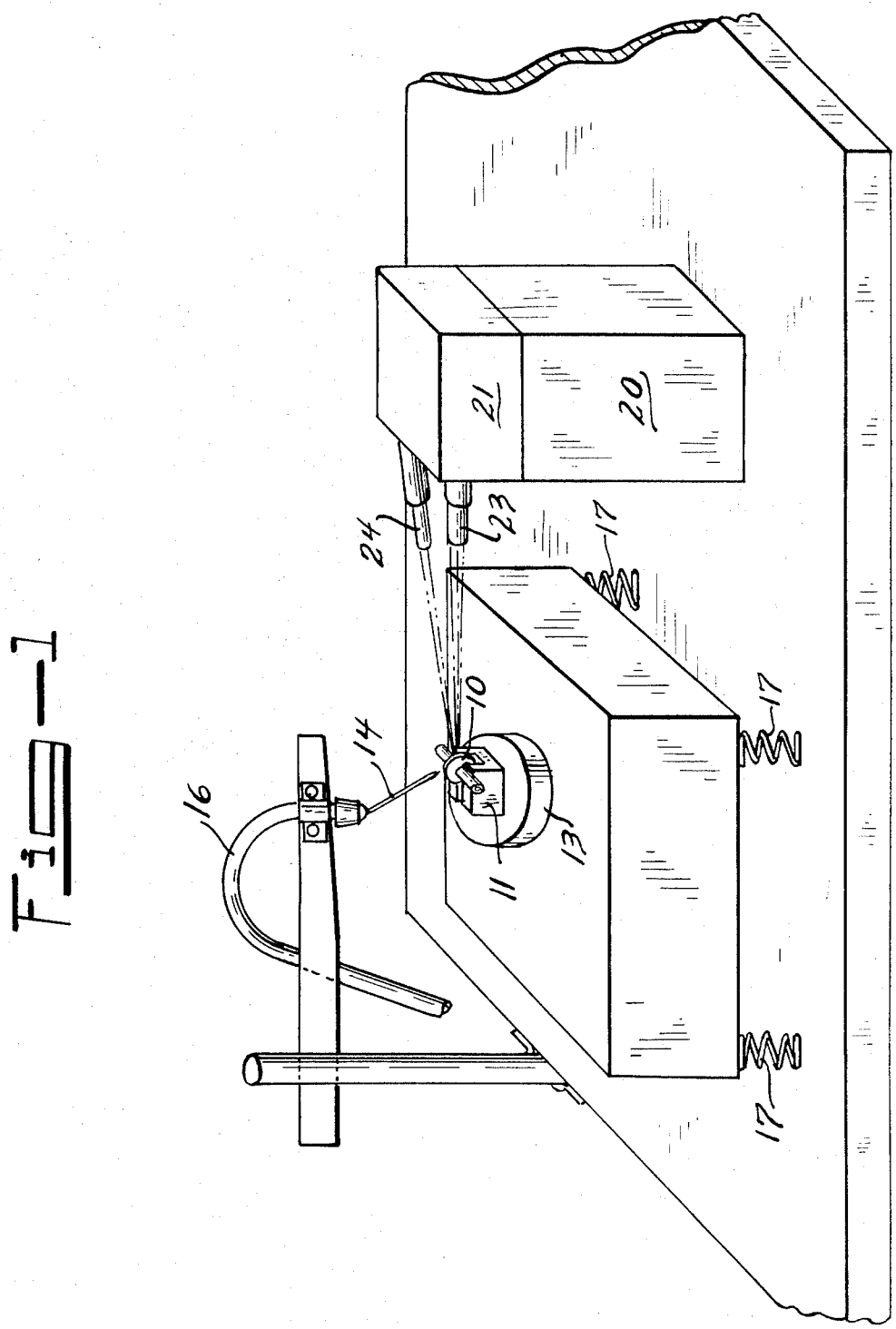
FIG. 1 is a view of the object being balanced together with the mechanical structure of the mounting and laser.

Referring to FIG. 1, there is shown the structure of the balancer. A verge 10 is the object which is to be balanced in this example. Verge 10 has a mass of approximately 1 gram and in order to achieve balance only a very small mass can be removed from the verge. The verge is supported in bearings mounted on a support assembly 11 which, in turn, is mounted on a transducer 13. A jet of air is supplied through needle 14 and air hose 16 and impinges on the verge 10. The air jet causes verge 10 to rotate. The support assembly 11 and transducer 13 are mounted on a block 18 which, in turn, is supported by isolation springs 17.

The control circuitry is mounted in a control unit 20 and the laser unit 21 is connected to the control unit 20. Laser unit 21 includes a laser 23 which is aimed at verge 10. Laser unit 21 may also include a strobe unit 24 timed to fire in synchronism with laser 23 in order that the point at which the laser will strike the rotating verge may be ascertained.

The laser structure and verge mounting structure shown in FIG. 1 is enclosed in a cabinet with interlocks (not shown). This is a safety feature, as the laser beam can be highly destructive to operators who are not properly shielded. As will be subsequently described, the interlock features prevent firing of the laser unless the cabinet is closed and locked.

Figure 2:
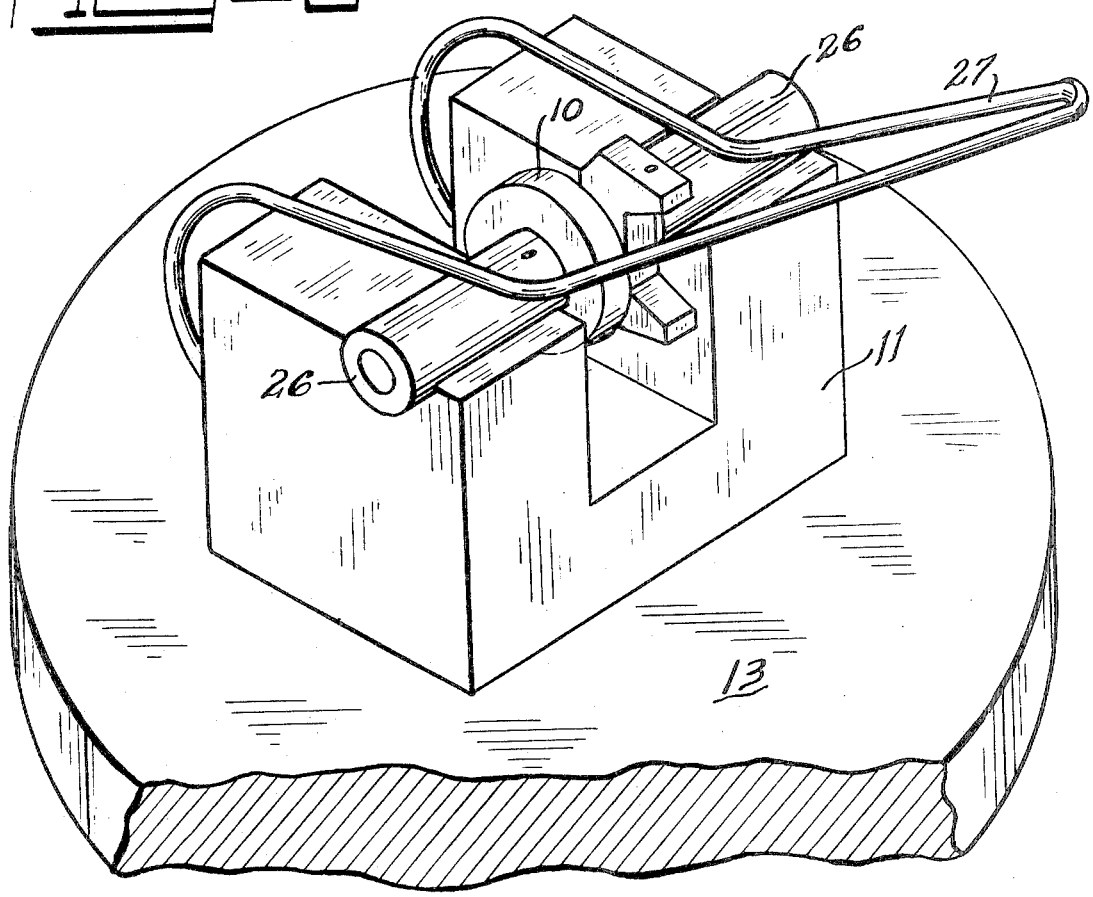
FIG. 2 is an enlarged drawing of the object's mounting structure.

Referring to FIG. 2, there is shown an enlarged drawing of the support assembly 11 mounted on transducer 13. The verge support assembly which is removable for ease of installing and removing verges consists of a pair of sapphire jewel bearings 26 which are mounted on a V-groove of the support assembly 11. The sapphire bearings 26 are held in position by spring clips 27.

Figure 3:
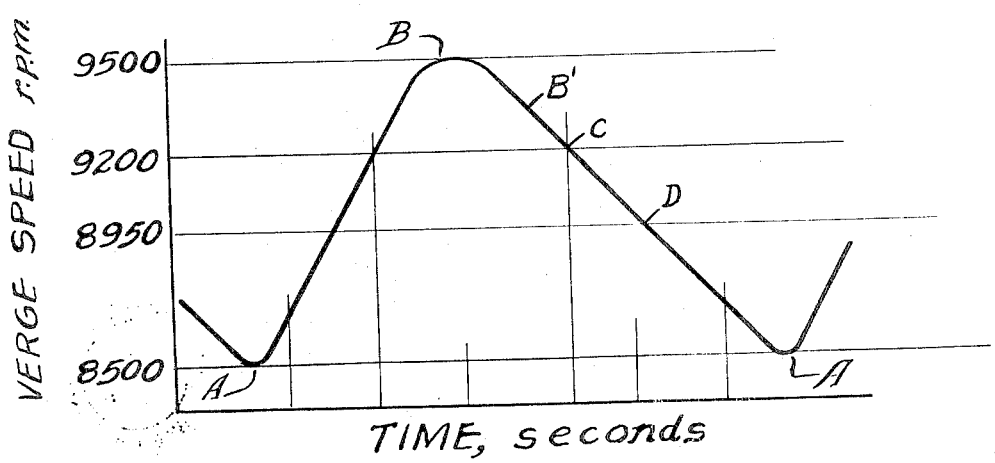
FIG. 3 is a curve showing the points at which the various operations take place.

Referring to FIG. 3, there is shown a plot of the verge rotation speed versus time. At point A the verge has been rotated under a low speed air jet and at this point the high speed air jet is turned on and the verge starts to accelerate to its maximum speed. At point B, the high speed air is turned off and the verge starts to lose speed. At point B, when the high speed air is turned off, the laser energy storage capacitors start charging. At point B', the charging has been completed and the laser is enabled for firing. At point C, the measure speed threshold sensor generates a signal consisting of a step change from 0 to 1 if the magnitude of the verge imbalance is less than a predetermined amount. If the verge is not balanced, the signal remains a zero. As the speed continues to decrease, it passes through the balancing speed, point D of FIG. 3, and a 1 signal is developed by a circuit to be subsequently described. When this occurs, a pulse enabling the laser is developed. This insures that the triggering of the laser does not occur during acceleration of the verge but only during deceleration. At a particular time during the enabling pulse a firing pulse is developed to fire the laser. The enabling pulse developed is of sufficient duration to insure that more than one revolution of the verge will occur while the enabling pulse is present. This permits the point at which a portion of the verge is removed to achieve balance to be selected as desired. At point A, the high speed air is again turned on and the cycle is repeated until balance is achieved.

Referring to FIG. 4, there is shown a block diagram of the balancing system and the measuring system used in this invention. The verge 31 which is to be balanced is mounted on bearings 32 attached to a piezo-type force transducer 34. Air from a pressure regulator 35 is directed by air pipe 37 against the verge to rotate the verge. Pressure regulator 35 has a high speed air and a low speed air adjustment which can be turned on and off by the logic circuitry, as will be subsequently described. The rotating verge can be illuminated by a strobe 39 in order to determine the spot 40 at which the laser beam will remove material. The spot at which material is to be removed can be selected in a manner which will be described. Laser 41 is also directed against spot 40 when it fires.

The above-described mechanism is contained in a cabinet 43 which is locked by a lid lock mechanism 44. Other parts of the mechanism can be within the cabinet 43 or outside as desired.

Force transducer 34 produces a sine wave as verge 31 rotates. This sine wave is at the frequency of the rotating verge and the signal is amplified by amplifier 46. The signal is filtered by bandpass filter 47 to remove unwanted frequencies and the filtered signal is applied to a plus to minus sensor 49, imbalance threshold sensor 50 and imbalance amplifier circuit 51. Bandpass filter 47 attenuates frequencies greater than the frequency of the signal developed by the rotating verge of the measuring speed and less than the frequency of the signal developed by the rotating verge at the balance speed.

The plus to minus sensor 49, senses the point at which the sine wave signal from filter 47 goes through zero in a plus to minus direction and develops an output pulse at this point. Imbalance threshold sensor 50 develops an output pulse when the magnitude of the imbalance is below a predetermined amount. The output of the imbalance amplifier circuit 51 is applied to a fire speed circuit 53 and measure speed circuit 54. Fire speed circuit 53 is responsive to the frequency of the imbalance signal to develop an output pulse when the frequency of the signal shows that the rotating object has reached the fire speed. In a similar manner, measure speed circuit 54 acts to develop an output pulse when the speed of the rotating object reaches the measuring speed.

Referring to FIGS. 4 and 5, the operation of the logic circuit which develops the proper signals to operate the device will be described. The output of the plus to minus sensor 49 is coupled to inverter 60 and through selector switch 61 to monostable multivibrator 63. Selector switch 61 can be used to select the desired phase of the cycle signal from plus to minus sensor 49. The cycle signal acts to trigger the monostable multivibrator 63 and the trailing edge of the pulse produced by monostable multivibrator 63 acts to trigger monostable multivibrator 65. Resistor 64 is used to vary the length of the pulse from monostable multivibrator 63. Since the monostable multivibrator 63 is triggered at the zero point in the cycle of signal developed by force transducer 34 of FIG. 4 by varying the length of the pulse from monostable multivibrator 63, the point in the rotational cycle of the rotating object at which monostable multivibrator 65 is triggered can be varied over a range of 180°. By selecting the proper phase by selector switch 61, the point at which monostable multivibrator 65 develops an output signal can be varied over a range of 360° in the rotation of the verge.

To start the cycle of operation, the low speed air control is operated to turn the low speed air on and start rotation of the verge 31. The operation of the verge can be observed and the test setup checked. The cabinet is closed and the lid locked with the lid lock control 71. The cycle control 72 is operated and a signal is transmitted to AND gate 74. The inputs to AND gate 74 from low speed air control 70 lock lid, control 71 and cycle start 72 develop an output signal which sets flip-flop 75. Flip-flop 75 then develops an output which sends an enabling signal to AND gate 76 and AND gate 78. With the lid locked, a lid lock signal is received from lid lock control 44 and is used as an enabling signal for AND gate 76 and the laser fire AND gate 80. The set output of flip-flop 75 is also coupled to high speed air timer 82 to start the operation of this air timer.

The operation of the high speed air timer 82 sends a signal to the pressure regulator 35, turning on the high speed air to accelerate the verge 31. An inhibit signal is also applied to AND gate 76 to prevent the laser capacitors from charging.

At the end of the high speed air cycle, the verge is rotating at a high rotational speed greater than the measuring speed or the laser firing speed. Timer 82 turns off the high speed air and the verge is then permitted to coast down to a lower speed. When the high speed air is removed, the inhibiting signal is removed from AND gate 76 and the laser capacitors are charged.

As the verge rotation shows, the point is reached at which the measure speed signal is generated by measure speed circuit 54 and is coupled to the monostable multivibrator 83. Monostable multivibrator 83 developes an enable signal which is applied to AND gate 84. AND gate 84 also receives an enabling signal from time delay 85. With the high speed air signal off, an inhibiting signal is removed from AND gate 84. At this point, if imbalance threshold detector 50 develops an output signal indicating that the amplitude of the imbalance is below a predetermined amount, an enabling signal is received by AND gate 84. If the magnitude is grater than the predetermined amount, no enabling signal is received. If the verge is balanced at this point, AND gate 84 develops an output signal which is coupled to AND gate 78. AND gate 78 then develops an output signal which returns flip-flop 75 to its reset position, ending the balancing cycle. Balance complete control 87 can also reset flip-flop 75 to end the cycle of operation.

If the magnitude of the imbalance is greater than the predetermined amount, the sequence continues and the verge coasts downward until the fire speed is reached. When the fire speed is reached, a signal from fire speed detecting circuit 53 is coupled to monostable multivibrator 88 to develop an output signal which is coupled to AND gate 90. At the predetermined point in the cycle, AND gate 90 receives a firing signal from monostable multivibrator 65. An enabling signal from time delay 85 and a fire signal from laser control 91 are also applied to AND gate 90. With the highspeed air turned off, the inhibiting signal to AND gate 90 is removed and AND gate 90 develops an output signal which is applied to time delay 85 and AND gate 80. Laser control 91 and strobe control 94 are mechanically interlocked so that only one can be operated at a time. With laser control 91 operated supplying an enabling signal to AND gate 90 and a disabling signal to the strobe AND gate 93, strobe control 94 is inoperative and the disabling signal to AND gate 80 is not present. The AND gate 80 then develops a firing signal which is applied to the laser 41 to fire the laser. The output signal from time delay 85 is removed and AND gate 90 is disabled immediately after the laser firing signal is produced. This prevents a laser firing signal from being developed for a period of time after the laser has been fired. This permits the verge to settle and recover from the impact of the laser beam before further measurements and firing are accomplished. This time delay signal from time delay 85 is also removed from AND gate 84 which controls the measuring speed.

If it is desired to operate in the strobe mode, strobe control 94 is operated. This turns off laser control 91 and a disabling signal is applied to the laser AND gate 80 and an enabling signal is applied to the strobe AND gate 93. In the strobe mode the firing signal from monostable multivibrator 65 is applied to AND gate 93 every cycle and a strobe firing signal is applied to the strobe unit 39. Strobe 39 acts to stop the rotation of the verge and show the point at which the laser beam will impact.

By rotating the verge to a high speed and then permitting the verge to coast downward in speed through measuring and firing speed ranges, more accurate measurement and balance procedure is obtained. The interlocking controls prevent measurement and laser firing for a predetermined period of time after a laser has fired so that the impact forces of the laser are not upsetting to the measuring process. Also, with the high speed air turned off during the measurement and firing process, the disturbances caused by the blast of air are not present at these times.

The embodiments of the invention in which an exclusive property or privilege is claimed are defined as follows:

1. The method of dynamically balancing an imbalanced rotatable object where said object is very small having a mass on the order of 1 gram, including the steps of:
   a. rotating said rotatable object to a predetermined speed with a first motive force from an air jet;
   b. decelarating the speed of rotation of said object by removing said first motive force from said object while maintaining a second motive force upon said object with said second motive force being less than said first motive force thereby allowing the speed of rotation of said object to drop successively to a measuring speed and a balancing speed;
   c. measuring with a force transducer the magnitude of said imbalance with said object at said measuring speed;
   d. developing a laser firing signal corresponding to the location and frequency of said imbalance with said object at said balancing speed and with said magnitude of imbalance measured at said measuring speed greater than a predetermined amount;
   e. firing a laser at said object at the point of imbalance in response to said laser firing signal with said object at said balancing speed, thereby removing a portion of said object;
   f. continuing automatically the balancing sequence of steps (a) through (e); and
   g. automatically stopping the balancing sequence with said magnitude of imbalance below a predetermined amount.

\* \* \* \* \*